U

United States Patent [19]
Richter et al.

[11] Patent Number: 5,072,092
[45] Date of Patent: Dec. 10, 1991

[54] EXCIMER LASER TREATMENT OF ENGINE BEARING SURFACES SUCH AS CYLINDERS

[75] Inventors: Klaus Richter, Nauheim; Georg Barton, Russelsheim, both of Fed. Rep. of Germany

[73] Assignee: General Motors Corporation, Detroit, Mich.

[21] Appl. No.: 558,876

[22] Filed: Jul. 26, 1990

[30] Foreign Application Priority Data

Sep. 28, 1989 [DE] Fed. Rep. of Germany ....... 3932328

[51] Int. Cl.$^5$ .............................................. B23K 26/00
[52] U.S. Cl. ............................ 219/121.72; 219/121.85
[58] Field of Search ...................... 219/121.65, 121.66, 219/121.6, 121.85, 121.72

[56] References Cited

U.S. PATENT DOCUMENTS 4,017,708 4/1977 Engel et al. ..................... 219/121.85
4,093,842 6/1978 Scott ............................... 219/121.85

FOREIGN PATENT DOCUMENTS 3029215 3/1982 Fed. Rep. of Germany .

OTHER PUBLICATIONS

Duley, W. W., Laser Processing and Analysis of Materials, 1983, Plenum Press, New York, pp. 26-27.
O'Shea Callen & Rhodes, Introduction to Lasers and Their Applications, 1977, Addison-Wesley Publishing Co., pp. 146-148.
Ready, Industrial Applications of Lasers, Academic Press, 1978, pp. 140-142.
Bergmann & Lee, Surface Treatment of Contact Materials with Excimer Lasers, World Lasers 1988, pp. 75-82 with translation.

Primary Examiner—C. L. Albritton
Attorney, Agent, or Firm—Robert J. Outland

[57] ABSTRACT

In a method and a device for processing surfaces subject to high stresses by friction in internal combustion engines, especially the honed cylinder bearing surfaces of piston engines, the surface is subjected to a laser beam treatment. A pulsed excimer laser is used in this case. By the laser beam treatment using excimer lasers, a microsmoothing and processing of the honed surface is achieved such that in sliding combinations, e.g., of pistons and cylinders in an internal combustion engine, friction and wear are essentially reduced during the breaking-in phase. This also means a reduction of the amount of oil needed to lubricate the sliding combination. By this means, a combustion that is friendlier to the environment and—possibly—a preservation and thus an increase in durability of the exhaust-gas-purification catalyst is obtained in the case of internal combustion engines.

6 Claims, 2 Drawing Sheets

EXCIMER LASER TREATMENT OF ENGINE BEARING SURFACES SUCH AS CYLINDERS

TECHNICAL FIELD

The invention pertains to a method for processing bearing surfaces subject to high stresses by friction in internal combustion engines, especially the cylinder bearing surfaces of piston engines, in which the surface is honed and additionally subjected to a laser beam treatment.

BACKGROUND

By honing the bearing surfaces of cylinder blocks (which can be cast iron or which can be constructed of other materials such as high performance ceramics or an aluminum alloy with a coating), a constant lubrication of the piston/cylinder sliding combination, as well as a low coefficient of friction, re achieved. Of course, in this case—depending on the surface structure present—a high breaking-in wear and increased oil consumption during the breaking-in time compared to the later operating time are allowed for.

A method of the initially described type has been known from DE 30 29 215 A1. In the known method, it is given that the cylinder inner walls have a fine grooving with slot-type grooves which are produced by prior machine-processing of the cylinder inner walls. The elevated areas between the slot-type grooves are subsequently processed by honing such that flat, non-hardened, cylindrical cylinder wall surface parts are obtained there. Then the bottom areas of the slot-type grooves lying between the honed elevations are treated with laser beams or electron beams so that martensitically hardened zones are produced (only) there. Since laser beams are used in the known method, the $CO_2$ laser conventional at that time was obviously used, with which martensitically hardened, wear-reducing tracks up to one mm deep should be obtained by transformation hardening without melting the surface.

SUMMARY OF THE INVENTION

In contrast to this, objectives of the present invention are to use the laser not for the martensitic or ledeburitic remelt-hardening of the cylinder bearing surface, but rather for wearing off (mainly by evaporation) the projecting roughness peaks or scales and loose adhesive particles from the mechanical processing and, in the case of cast iron bores, for exposing the graphite coated with the so-called iron shell.

In accordance with the invention, the objectives are solved by a method wherein after honing, laser beam treatment is provided by a pulsed excimer laser.

Such excimer lasers are different from the conventional $CO_2$ lasers in that they do not work in continuous operation, but rather emit high-energy pulses with a very short pulse duration (several nanoseconds). By this means, the treated surface is briefly subjected to a high temperature (for example up to 50,000° K.) which mainly leads to the evaporation of a thin surface layer. The material particles adhering loosely to the surface, produced by the honing, as well as scales, are also evaporated since they are heated so intensely they cannot easily transmit the heat into the matrix.

Consequently, an excimer laser treatment advantageously effects a microsmoothing of the surface eliminates loosely-adhering material particles and scales and exposes the coated graphite lamellae. However, the honing rings or marks are maintained after this treatment. A slight melting of the surface is unavoidable in the case of the excimer exposure. However, a measurable martensitic edge layer is not formed as a result of transformation hardening, and a ledeburitic edge layer is not formed as a result of remelting by means of a $CO_2$ laser, but rather a thin, in the nanometer range ($<1$ μm), mostly supersaturated or hard, non-equilibrium skin on the surface is formed.

In addition to the microsmoothing effect which reduces the breaking-in wear of the cylinder bearing walls, the corrosion and wear resistance of the honed cylinders is actually increased by the hard, supersaturated remelt skin. In addition, the Cr in the remelt skin which is in solution or supersaturation is highly corrosion resistant against moistness and the combustion products.

In summary, the advantages of the processing with excimer lasers according to the invention are that a wearing away mainly of the projecting roughness areas (roughness peaks) and scales and loosely-adhering processing particles, as well as a graphite exposure in a nonmechanical contactless manner (contrary to the so-called "brush honing"), i.e., without contact in very short treatment times, is possible without destroying the present, necessary honing rings. By this means, the breaking-in wear is essentially reduced, and consequently, the breaking-in phase is also shortened. By this means, the conventional high oil consumption is again decreased in the breaking-in time and a combustion that is friendlier to the environment is guaranteed.

Since a reciprocating engine with catalyst-exhaust-gas purification is involved, the advantageous secondary effect that—as a result of the reduced oil consumption in the breaking-in time—the efficiency and durability of the catalyst carrier are essentially increased is achieved by the invention.

Advantageous preferred embodiments of the method in accordance with the invention are detailed in the following detailed description.

BRIEF DRAWING DESCRIPTION

With reference to a schematic, and compared to the natural dimensions, very enlarged sectional representation, a surface structure obtained by excimer laser treatment as an exemplary embodiment of the invention is shown in FIG. 1 in the drawing, while FIGS. 2 and 3 show such a surface structure as an example of a honed cylinder surface in a scanning-electron-microscopic photograph.

DETAILED DESCRIPTION

Figure 1:
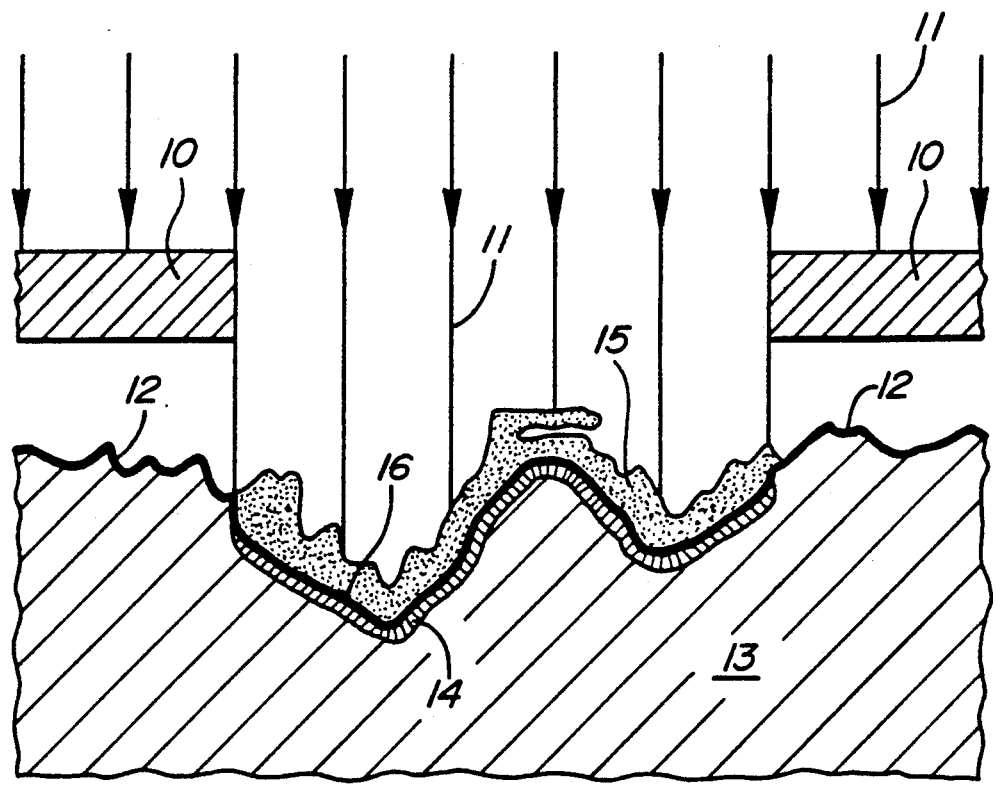

In FIG. 1, numeral 10 is a mask and lines 11 represent beams of an excimer laser that is of known construction and therefore not illustrated in detail. In this case, it can be a laser with a wavelength <1,100 nm, preferably an XeCl laser with a wavelength of 308 nm, an $Xe_2F$ laser with a wavelength of 245 to 610 nm or an ArF laser with a wavelength of 193 nm.

Compared to the conventional $CO_2$ lasers, such excimer lasers have a much higher productivity since they can process a larger surface with a pulse rate up to 1,000 per second and works also in the defocussed state. The use of such excimer lasers is, moreover, favorable in that they are suitable for the use both of fiber optics and mirror optics.

The laser processing tracks on the cylindrical honing surfaces can be designed in a spiral manner by inserting and rotating or—in a winding manner—only by insertion and cyclic rotation of the optics.

By generating a radial beam deviated a full 360° C., a cylinder bearing surface can be designed by inserting the annular deviation mirror without rotation or a facet mirror with rotation.

As an alternative, an installation which has a number of optics corresponding to the number of cylinders of the engine block is possible. In this case, the processing can take place by simply inserting all optics at the same time.

As the drawing shows, a contour 12 of a surface 13. e.g., the cylinder bearing surface of a piston engine, is changed by the laser beam treatment after honing such that, on the one hand, a melted layer 14, and on the other hand, an evaporated layer 15, are produced on the surface. The melted layer 14 is produced by melting a very thin surface layer with a thickness of about 0.01-3 μm, which, as a result of the high quenching rate, as well as possibly by alloying from the gas phase, also leads to an increased wear resistance of the surface.

The evaporated layer 15 is produced by an evaporation of the roughness peaks or of the projecting particles of the surface 12 being processed by honing. In this case, the microscopically rough contour of the honed surface 12 are smoothed; however, the honing marks are maintained. The skin being produced under the evaporated layer 15 is characterized by an increased resistance to wear and corrosion. The macro contour being produced after laser exposure is designated as 16 in the drawing.

Otherwise, the treatment parameters of the excimer laser used (pulse energy, pulse length, number of pulses, repetition rate, beam overlapping of the treated surface, etc.) can be optimized depending on the material honed, the honing depth as well as the type of honing strips.

Figure 2:
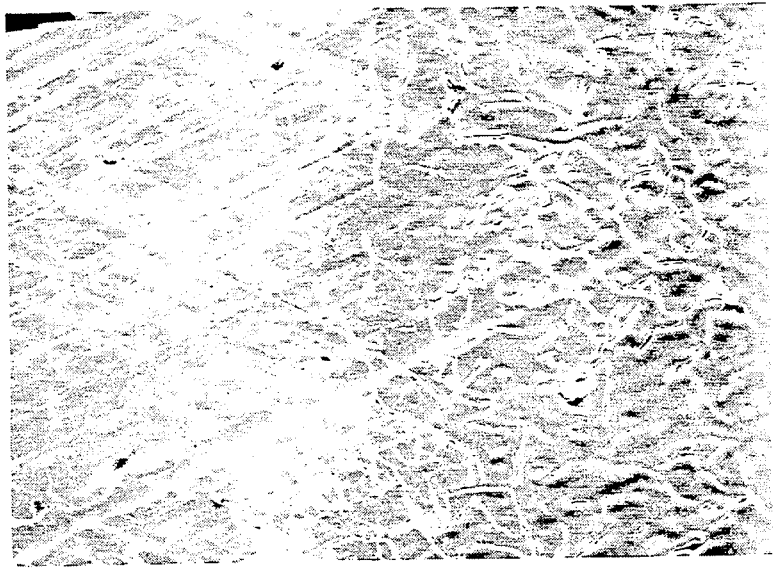

As a photograph under the scanning-electron microscope, FIG. 2 shows in the left half of the picture a honed surface structure of a cylinder bearing surface in cutout and in the right half of the picture this structure after excimer laser treatment has been performed.

Figure 3:
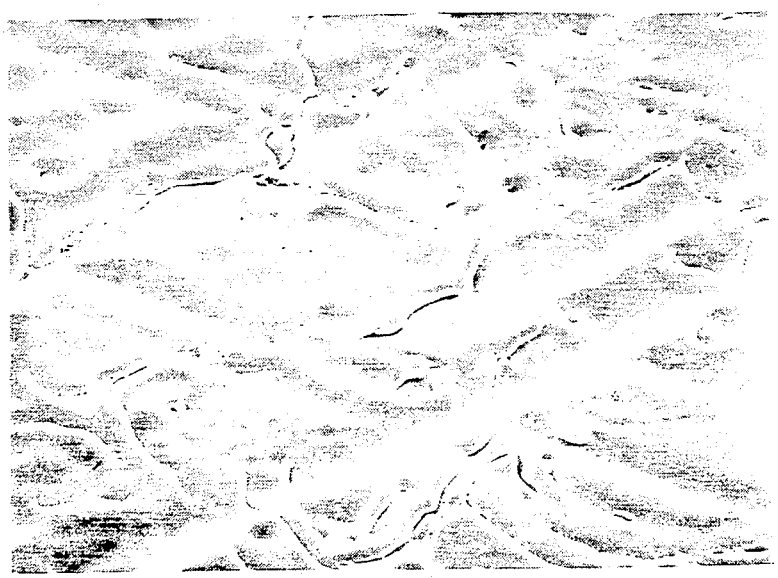

The right half of the picture of FIG. 2 is again illustrated in an enlarged view in FIG. 3. The honing rings remain, and the graphite lamellae are exposed.

What is claimed is:

1. A method for processing bearing surfaces in internal combustion engines, especially such a bearing cylinder wall surfaces of piston engines, in which the surface is honed and additionally subjected to a laser beam treatment, wherein after honing, the laser beam treatment is performed by means of a pulsed excimer laser 10, 11.

2. A method as in claim 1, wherein the laser 10, 11 beam has a wavelength below 1,100 nm.

3. A method as in claim 2 wherein the laser beam wavelength is in the range of 250-350 nm.

4. A method as in claim 2, wherein the honed surface forms oil-conveying honing rings and the laser beam treatment is controlled such that the bearing surface is subjected to microsmoothing by surface evaporation, while the oil-conveying honing rings are maintained with only a slight change in their condition.

5. A method as in claim 4, wherein a thin surface layer is produced as a result of evaporation and is additionally enriched by at least one alloying element, through providing an alloying gas atmosphere during the laser beam treatment.

6. A method as in claim 1, wherein the laser beam irradiates in a stripwise manner the entire circumference of the bearing surface.

* * * * *